United States Patent [19]
Kashihara et al.

[11] Patent Number: 5,122,716
[45] Date of Patent: Jun. 16, 1992

[54] APPARATUS FOR REVERSIBLY CONTROLLING A MOTOR

[75] Inventors: Masanobu Kashihara; Takayuki Kifuku, both of Himeji, Japan

[73] Assignee: Mitsubishi Denki K.K., Tokyo, Japan

[21] Appl. No.: 727,743

[22] Filed: Jul. 10, 1991

[30] Foreign Application Priority Data

Jul. 31, 1990 [JP] Japan ................... 2-205786

[51] Int. Cl.$^5$ ............................................. H02P 1/22
[52] U.S. Cl. .................................... 318/280; 318/257; 388/907.5
[58] Field of Search ............... 318/256, 257, 268, 280, 318/287, 291, 293; 388/907.5

[56] References Cited

U.S. PATENT DOCUMENTS

| | | | |
|---|---|---|---|
| 3,947,738 | 3/1976 | Oliver | 318/599 X |
| 4,800,324 | 1/1989 | Kuttner | 318/293 |
| 4,870,334 | 9/1989 | Iwasa et al. | 318/432 |
| 4,896,179 | 1/1990 | Watanabe et al. | 354/195.1 |

Primary Examiner—Bentsu Ro
Attorney, Agent, or Firm—Sughrue, Mion, Zinn Macpeak & Seas

[57] ABSTRACT

A reversible control apparatus for controlling a motor is provided which is highly durable, weather proof, simple in structure and inexpensive to manufacture. The motor is controllably driven by a motor driver. A target rotational speed determiner determines a target rotational speed for the motor and generates a corresponding output signal. A rotational speed sensor senses the rotational speed of the motor and generates a corresponding output signal having no polarity which indicates the direction of rotation of the motor. A motor controller controls the motor driver. A polarity applying means applies a polarity to the output signal of the rotational speed sensor on the basis of the output signal of the target rotational speed signal and the output signal of the motor controller. The polarity applying means further determines whether there is agreement therebetween the direction of rotation of the target rotational speed signal and that of the output signal of the motor controller and generate, if there is disagreement therebetween, a motor driver control signal for making the output signal of the motor controller to zero until the direction of rotation of the target rotational speed signal coincides with that of the output signal of the motor controller. A subtracter generates a deviation signal representative of a deviation between the target rotational speed signal and the polarity-applied rotational speed signal to the motor controller.

3 Claims, 6 Drawing Sheets

APPARATUS FOR REVERSIBLY CONTROLLING A MOTOR

BACKGROUND OF THE INVENTION

The present invention relates to a reversible control apparatus which is able to control a motor in a reversible manner in accordance with a target rotational speed thereof.

In general, a DC generator or a two-phase pulse generator is employed as a rotational speed sensor which is used with a control apparatus for controlling a motor such as a DC motor in a reversible manner so as to obtain an output signal with a positive or negative polarity in dependence upon the rotational direction of the motor.

A rotational speed sensor in the form of a DC generator is generally provided with a brush which poses problems from the standpoint of durability and weather resistance. In addition, it is desirable for a rotational speed sensor particularly suitable for use with a servo system to have a lesser inertial mass.

On the other hand, a rotational speed sensor in the form of a two-phase pulse generator requires two pulse generators, so the structure of the sensor necessarily becomes complicated, resulting in an increase in the manufacturing cost.

SUMMARY OF THE INVENTION

Accordingly, the present invention is intended to overcome the above-described problems encountered with the known apparatuses.

It is an object of the present invention to provide a novel and improved reversible control apparatus for controlling a motor in a reversible manner which is highly durable, weather proof, simple in structure and inexpensive to manufacture.

In order to achieve the above object, according to the present invention, there is provided a reversible control apparatus for controlling a motor in a reversible manner comprising:

a motor driver for driving the motor;

a target rotational speed determiner for determining a target rotational speed for the motor and generating an output signal representative of the thus determined target rotational speed;

a rotational speed sensor for sensing the rotational speed of the motor and generating a corresponding output signal having no polarity indicative of the direction of rotation of the motor;

a motor controller for controlling the motor driver;

polarity applying means for applying a polarity to the output signal of the rotational speed sensor on the basis of the output signal of the target rotational speed signal and the output signal of the motor controller, the polarity applying means being further operable to determine whether there is agreement between the direction of rotation of the target rotational speed signal and that of the output signal of the motor controller and generate, if there is disagreement in the direction of rotation of these signals, a motor driver control signal for making the output signal of the motor controller to zero until the direction of rotation of the target rotational speed signal coincides with that of the output signal of the motor controller; and a subtracter for generating a deviation signal representative of a deviation between the target rotational speed signal and the polarity-applied rotational speed signal to the motor controller.

Preferably, the polarity applying means determines whether the polarity of the target rotational speed signal is positive or negative; applies the same polarity as that of the target rotational speed signal; calculates a deviation between the polarity-applied output signal of the rotational speed sensor and the target rotational speed signal to provide a corresponding control output; makes a comparison between the polarity of the target rotational speed signal and that of the control output; allows the motor driver to drive the motor based on the control signal from the motor controller if there is agreement in the polarity between the target rotational speed signal and the control output; and generates a motor driver control signal to the motor driver to make the output of the motor driver to zero if there is disagreement in the polarity between the target rotational speed signal and the control output.

The above and other objects, features and advantages of the invention will become more readily apparent from the following detailed description of a preferred embodiment thereof taken in conjunction with the accompanying drawings.

DESCRIPTION OF THE PREFERRED EMBODIMENT

A preferred embodiment of the present invention will now be described in detail with reference to the accompanying drawings.

Figure 1:
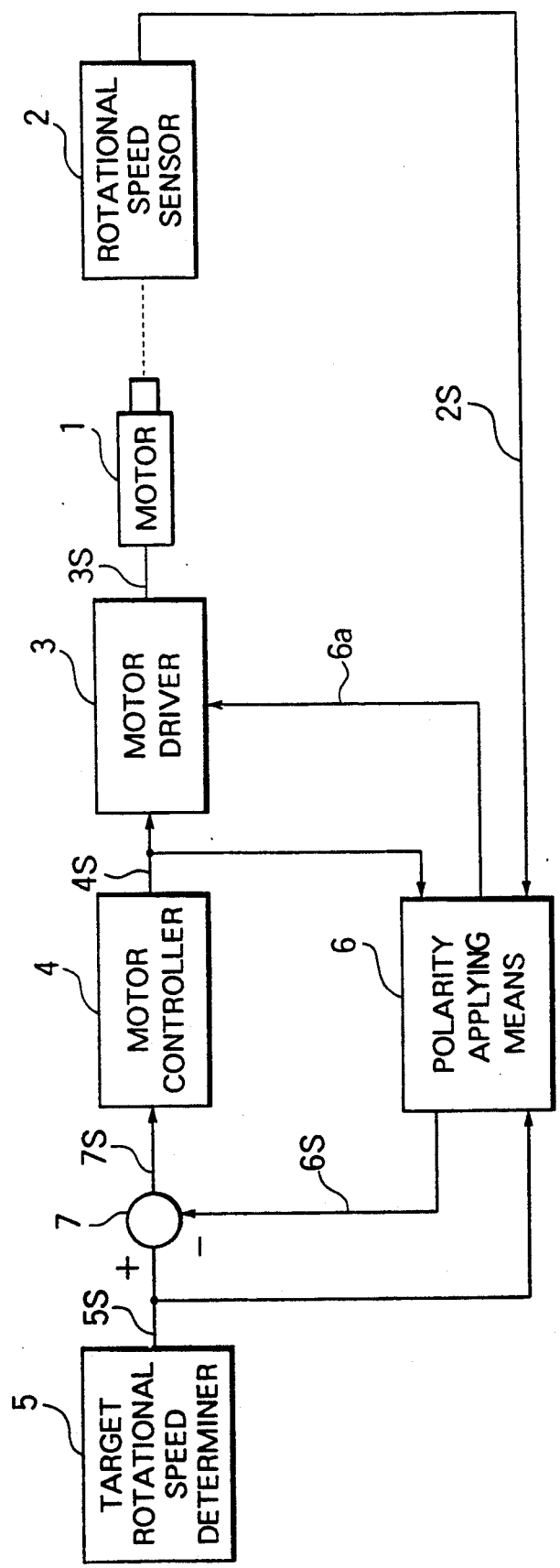
FIG. 1 is a block diagram of a reversible control apparatus in accordance with a preferred embodiment of the present invention.

Referring first to FIG. 1, there is diagrammatically shown a reversible control apparatus for controlling an electric motor 1 in a reversible manner which is constructed in accordance with the principles of the invention. A rotational speed sensor 2 senses the rotational speed of the motor 1 in the form of a DC motor. In the illustrated embodiment, the rotational speed sensor 2 comprises an AC generator in the form of a magneto generator. The rotational speed sensor 2 generates an output signal 2S with no polarity representative of the sensed rotational speed of the motor 1 to a polarity applying means 6 which will be described in detail later. A target speed determiner 5 determines a target rotational speed of the DC motor 1 and generates an output signal 5S in the form of a sinusoidal wave representative of the target rotational speed thus determined to the polarity applying means 6 and a subtracter 7. The subtracter 7 calculates a difference or deviation between the target rotational speed and the actual rotational speed as sensed by the rotational speed sensor 2, and sends an output signal 7S representative of the deviation thus calculated to a motor controller 4 which generates a control signal 4S to a motor driver 3 and to the polarity applying means 6 as well.

Based on the output signal 5S of the rotational speed sensor 5 and the output signal 4S of the motor controller 4, the polarity applying means 6 applies a positive or negative polarity to the output signal 2S of the rotational speed sensor 2 which is then supplied as a polarity-applied rotational speed signal 6S to the subtracter 7. The polarity applying means 6 also serves to generate a motor driver control signal 6A for making the output signal 3S of the motor driver 3 to zero if there is disagreement in polarity between the output signal 4S of the motor controller 4 and the output signal 5S of the target rotational speed determiner 5.

The subtracter 7 performs subtraction between the target rotational speed signal 5S from the target rotational speed determiner 5 and the polarity-applied rotational speed signal 6S from the polarity applying means 6 to provide a deviation signal 7S which is fed to the motor controller 4.

The motor driver 3 are controlled by the output signal 4S from the motor controller 4 to generate an output signal 3S to the DC motor 1 for controllably driving it. When the polarity applying means 6 generates a motor driver control signal 6A, the motor driver 3 operates to stop the signal supply to the motor 1.

The motor controller 4, the target rotational speed determiner 5, the polarity applying means 6 and the subtracter 7 may either be constructed by hardware components or by a microcomputer which executes a software program for performing their operation.

The operation of the above-mentioned reversible control apparatus will now be described while referring to the characteristic charts of FIGS. 3 through 5.

First, the target rotational speed determiner 5 generates an output signal 5S representative of a prescribed target rotational speed for the motor 1 which is fed to the subtracter 7 and the polarity applying means 6.

The subtracter 7 subtracts the polarity-applied rotational speed signal 6S of the polarity applying means 6 from the target rotational speed signal 5S, and generates a deviation signal 7S which is input to the motor controller 4. The motor controller 4 generates an output signal 4S corresponding to the deviation signal 7S and supplies it to the motor driver 3 and the polarity applying means 6.

The motor driver 3 drives or energizes the DC motor 1 in accordance with the output signal 4S from the motor controller 4. The rotational speed of the motor 1 is sensed by the rotational speed sensor 2 which is, in the illustrated embodiment, an AC generator which generates a positive voltage irrespective of the rotational direction of the motor 1, as shown by solid line 2S in FIG. 3. Thus, the output signal 2S of the rotational speed sensor 2 can not directly be utilized for reversibly controlling the DC motor 1. For this reason, an appropriate polarity is applied to the output signal 2S of the rotational speed sensor 2 by the polarity applying means 6 to provide a polarity-applied rotational speed signal 6S which has different polarities for the clockwise and counter-clockwise rotation (e.g., a positive polarity for the clockwise rotation and a negative polarity for the counter-clockwise rotation) of the motor output shaft so as to control the DC motor 1 in a reversible manner.

Next, the process of reversibly controlling the rotation of the DC motor 1 will be described below with particular reference to the flow chart of FIG. 6.

First, in Step S1, the polarity applying means 6 determines the polarity (i.e., rotational direction) of the target rotational speed signal 5S from the target rotational speed determiner 5. If the polarity is positive (e.g., the rotational direction of the target rotational speed signal 5S is clockwise or right-hand), the program goes to Step S2, whereas if it is negative (e.g., the rotational direction of the target rotational speed signal 5S is counter-clockwise or left-hand), the program goes to Step S3. Specifically, if it is determined in Step S1 that the polarity of the target rotational speed signal 5S is positive, then in Step S2, a positive polarity is applied to the output signal 2S from the rotational speed sensor 2. On the other hand, if the polarity of the target rotational speed signal 5S is determined to be negative, then in Step S3, a negative polarity is applied to the output signal 2S from the target rotational speed sensor 2.

Figure 3:
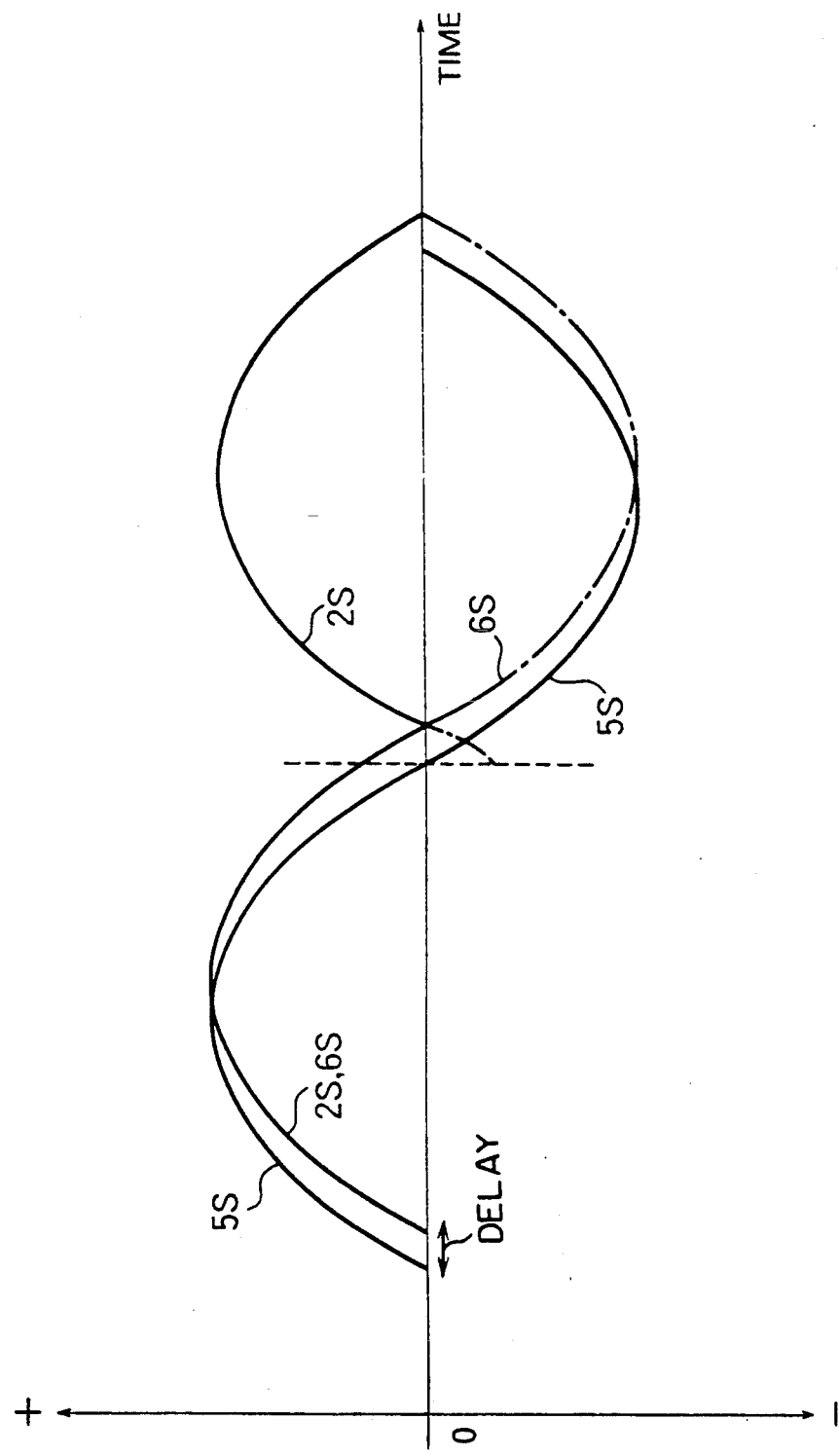
FIG. 3 is a graphic representation showing the relationship between an output signal 5S of a target rotational speed determiner 5, an output signal 2S of a rotational speed sensor 2 and an output signal 6S of a polarity applying means 6 of FIG. 1.
Figure 4:
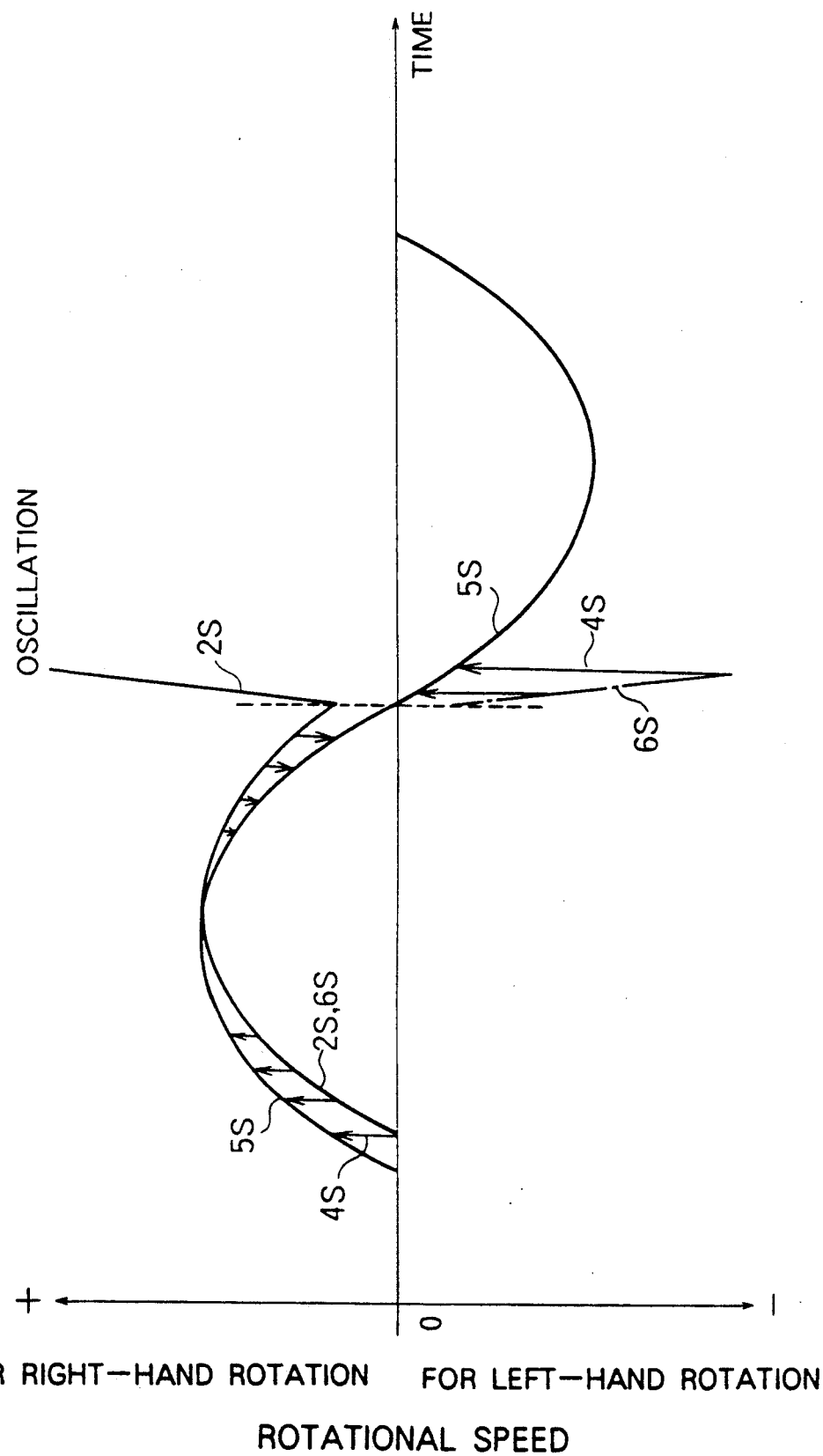
FIG. 4 is a view similar to FIG. 3, but showing the possibility of oscillations of the output signals 2S, 6S of the rotational speed sensor 2 and the polarity applying means 6.

FIG. 3 shows the relationship between the output signal 2S of the rotational speed sensor 2, the target rotational speed signal 5S of the target rotational speed determiner 5 and the polarity-applied rotational speed signal 6S of the polarity applying means 6, as processed through Steps S1 through S3.

As illustrated in FIG. 3, the rotational speed of the output shaft of the DC motor 1 indicated by 2S follows the target rotational speed 5S with a certain delay, so at a point in time when the target rotational speed 5S crosses the neutral or zero axis upon a change in the rotational direction thereof, the rotational speed of the output shaft of the motor 1, which is indicated by the output signal 2S of the rotational speed sensor 2, does not sometimes become equal to zero, thus giving rise to the possibility that the motor controller 4 becomes unable to control the motor 1.

In this connection, reference is had to the case in which the direction of rotation of the target rotational speed 5S is gradually changed from the right-hand or clockwise rotation into the left-hand or counter-clockwise rotation, for example.

As the target rotational speed determiner 5 is decreasing the clockwise rotation of the target rotational speed 5S, the motor controller 4 first calculates, in Step S4, a deviation signal 7S representative of a deviation between the polarity-applied rotational speed signal 6S and the target rotational speed signal 5S, then calculates a control output for decreasing the clockwise rotation of the target rotational speed 5S on the basis of the deviation signal 7S, and generates an output signal 4S representative of the thus calculated control output.

The output signal 4S of the motor controller 4 is fed to the motor driver 3 which generates a motor drive signal 3S to the DC motor 1 for decreasing the clockwise rotation of the motor 1.

Accordingly, the target rotational speed decreases to zero from the clockwise rotational direction, and then changes into a counter-clockwise rotation. In this case, however, at the time when the target rotational speed signal 5S becomes equal to zero, the motor 1 still continues to rotate in the clockwise direction because of mechanical delays due, for example, to the moment of inertia and the like. Therefore, the output signal 4S of the motor controller 4 should still act to decrease the clockwise rotation of the target rotation speed. Contrary to this, however, as referred to above, according to the polarity applying procedure performed through Steps S1 to S3, a polarity (e.g., a negative polarity) for counter-clockwise rotation is applied to the output signal 2S of the rotational speed sensor 2, so the polarity applying means 6 generates a polarity-applied rotational speed signal 6S indicative of that the DC motor 1 is rotating in the counter-clockwise direction at a speed greater than the target rotational speed. As a result, on the basis of a deviation signal 7S of the subtracter 7 representative of a deviation between the target rotational speed signal 5S and the polarity-applied rotational speed signal 6S, the motor controller 4 produces a control output which acts to decrease the counter-clockwise rotation of the motor output shaft, i.e., increase the clockwise rotation thereof. Thus, in spite of the fact that the output shaft of the DC motor 1 increases the clockwise rotation thereof, the polarity applying means 6 generates a polarity-applied rotational speed signal 6S for increasing the clockwise rotation of the motor output shaft. In other words, the deviation signal 7S increases so that the control output of the motor controller 4 for decreasing the counter-clockwise rotation of the motor output shaft increases. As a result, the signals 2S, 6S finally begin to oscillate, as shown in FIG. 4.

Figure 6:
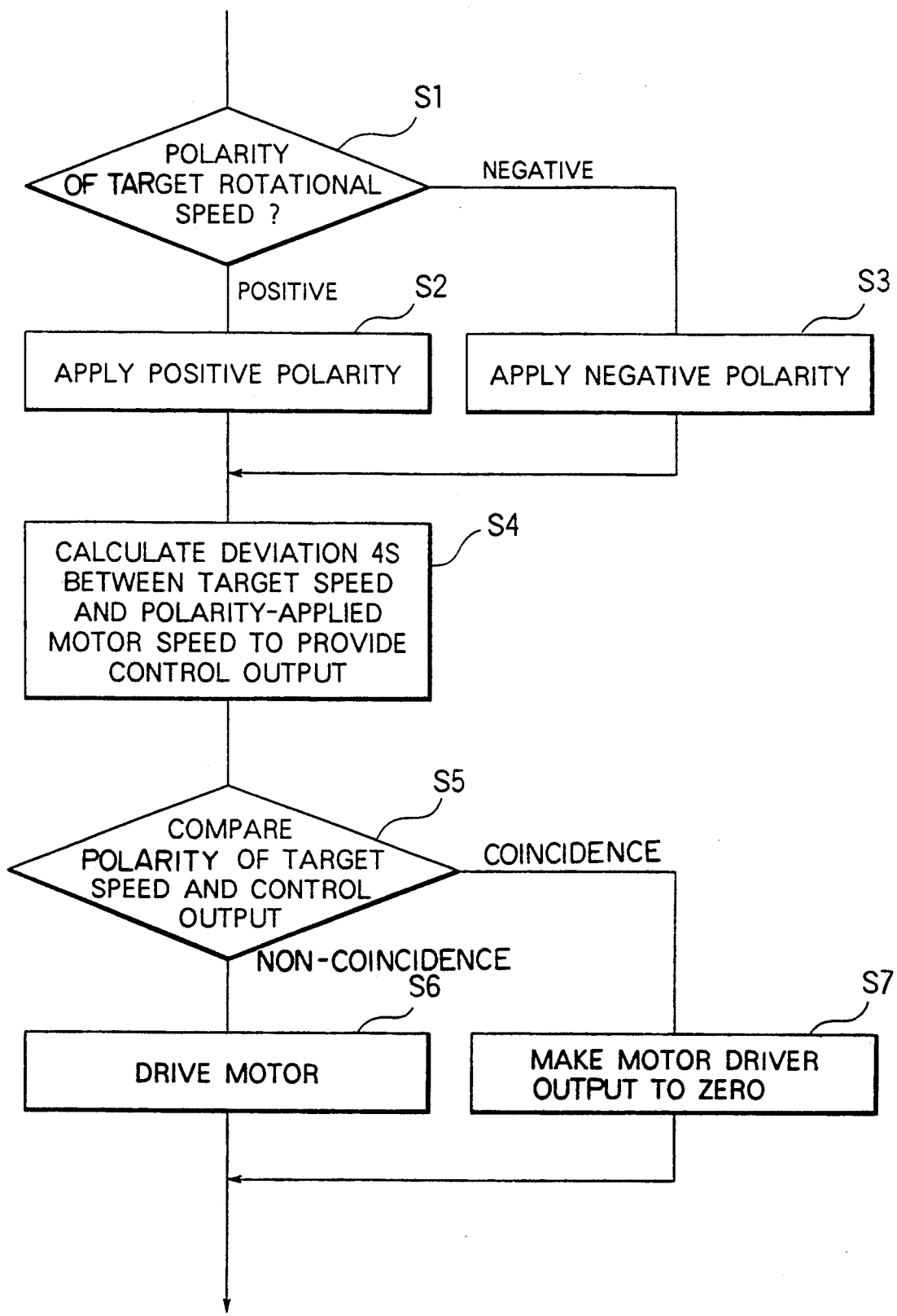
FIG. 6 is a flow chart showing a process of providing the output signal of the rotational speed sensor of FIG. 1 with appropriate polarities by means of the polarity applying means of FIG. 1.

In order to avoid this situation, the process as shown by Steps S4 through S7 in the flow chart of FIG. 6 is performed. Specifically, in Step S4, the subtracter 7 generates a deviation signal 7S, based on which the motor controller 4 outputs a control signal 4S. In this Step S4, a comparison is made between the polarity based on the rotational direction of the target rotational speed signal 5S and the polarity based on the rotational direction of the output signal 4S of the motor controller 4. As a result of this comparison, if there is disagreement between the polarities, the program jumps from Step S5 into Step S7 where the polarity applying means 6 continues to generate a motor driver control signal 6A to the motor driver 3 so as to make the output signal 3S of the motor driver 3 to zero until the above polarities coincides with each other.

If, however, it is determined in Step S5 that there is agreement between the polarities, then in Step S6, the polarity applying means 6 stops generating the motor driver control signal 6A to the motor driver 3, so the motor driver 3 supplies an output signal 3S to the motor 1, thereby driving it.

Figure 5:
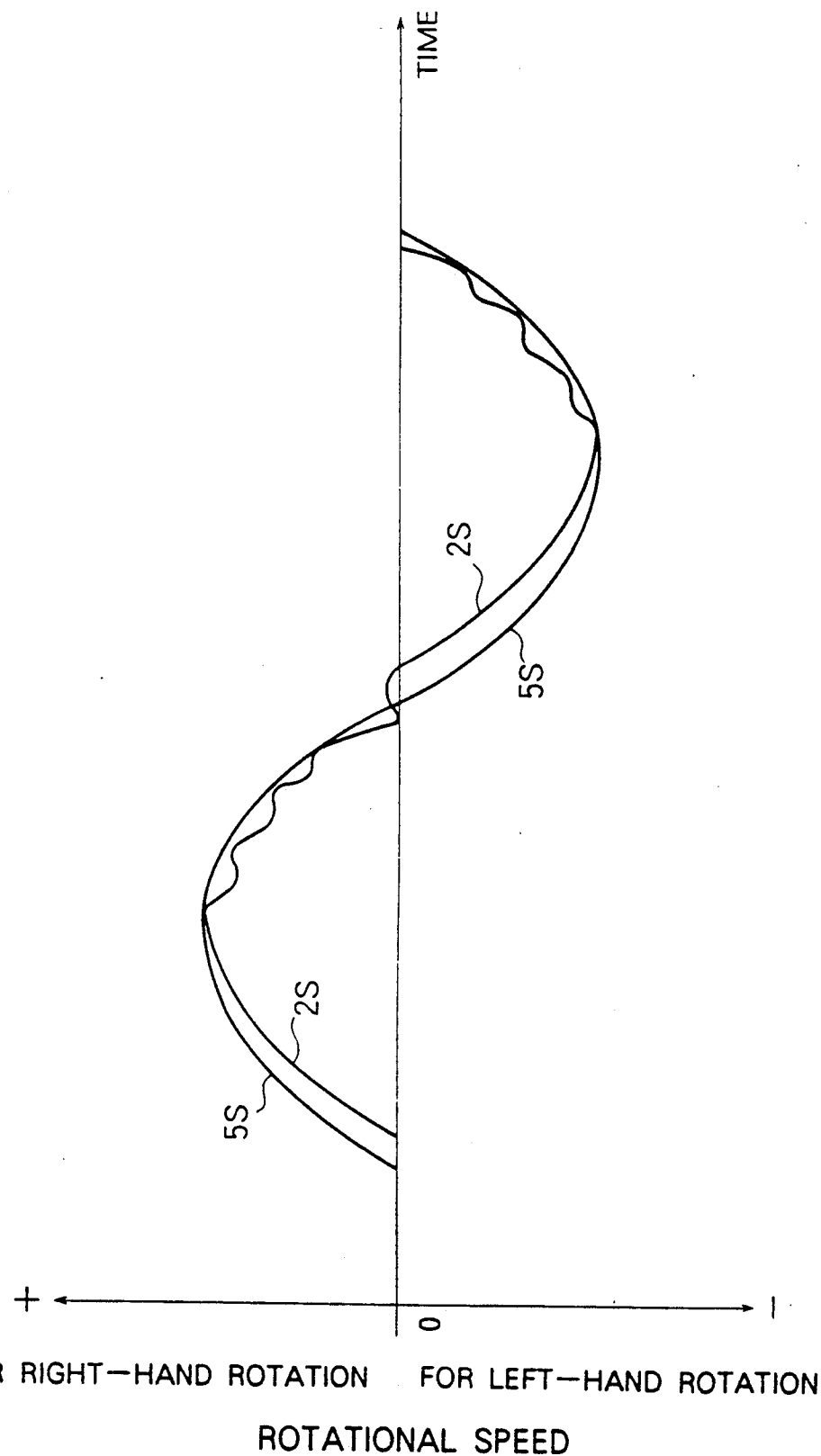
FIG. 5 is a graphic representation showing the operational characteristics of the reversible control apparatus of the invention of FIG. 1.

In this manner, the rotational speed of the output shaft of the motor 1 is effectively prevented from exceeding the target rotational speed, thus providing the motor 1 with operational characteristics, as shown in FIG. 5. This serves to prevent oscillation of the control output of the motor controller 4.

Figure 2:
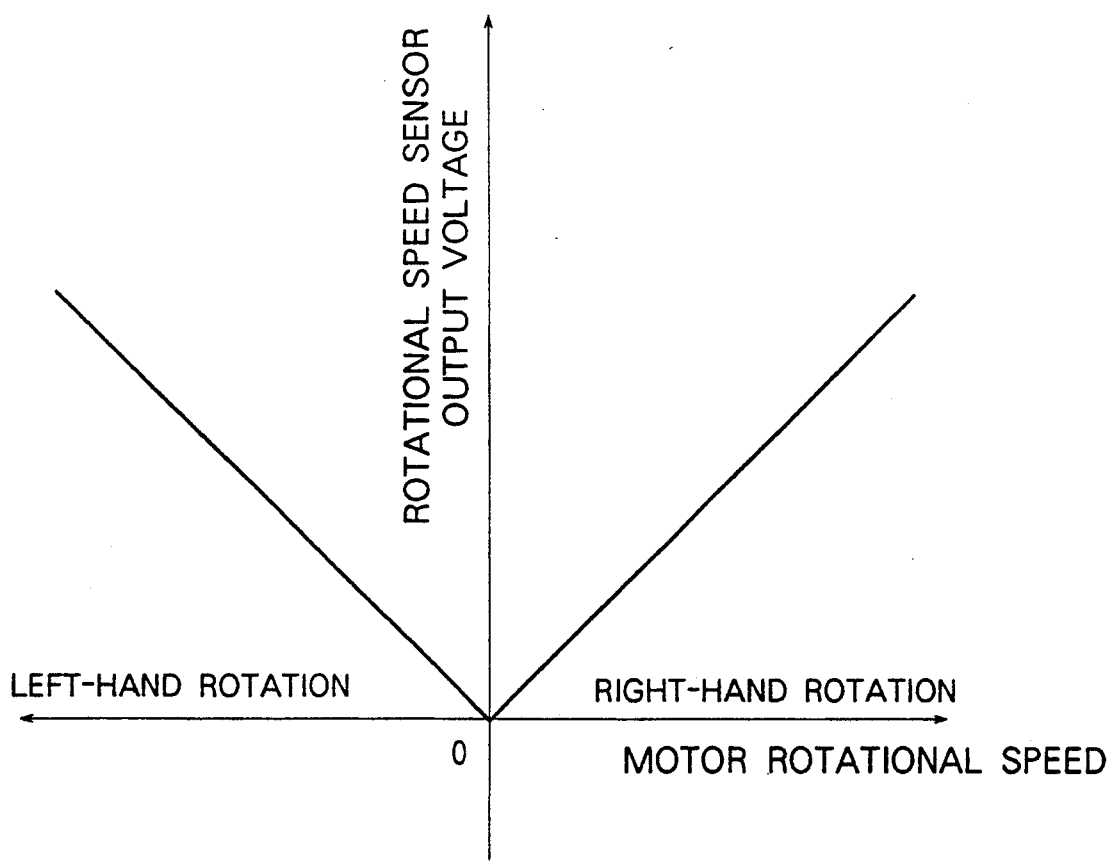
FIG. 2 is a graphic representation showing the output characteristics of a rotational speed sensor of FIG. 1 with respect to the rotational speed of the output shaft of a motor.

As described in the foregoing and as can be seen from FIG. 2, even by use of the rotational speed sensor 2 which is unable to sense the direction of rotation of the motor 1, it is possible to perform reversible control on the DC motor 1 by applying appropriate polarities to the output signal 2S of the rotational speed sensor 2 in accordance with the procedure as shown in the flow chart of FIG. 6.

What is claimed is:

1. A reversible control apparatus for controlling a motor in a reversible manner comprising:
   a motor driver for driving the motor;
   a target rotational speed determiner for determining a target rotational speed for the motor and generating an output signal representative of the thus determined target rotational speed;
   a rotational speed sensor for sensing the rotational speed of the motor and generating a corresponding output signal having no polarity which indicates the direction of rotation of the motor;
   a motor controller for controlling said motor driver;
   polarity applying means for applying a polarity to the output signal of said rotational speed sensor on the basis of the output signal of the target rotational speed signal and the output signal of said motor controller, said polarity applying means being further operable to determine whether there is agreement between the direction of rotation of the target rotational speed signal and that of the output signal of said motor controller and generate, if there is disagreement in the direction of rotation of these signals, a motor driver control signal for making the output signal of said motor controller to zero until the direction of rotation of the target rotational speed signal coincides with that of the output signal of said motor controller; and
   a subtracter for generating a deviation signal representative of a deviation between the target rotational speed signal and the polarity-applied rotational speed signal to said motor controller.

2. A reversible control apparatus according to claim 1, wherein said polarity applying means determines whether the polarity of the target rotational speed signal is positive or negative; applies the same polarity as that of the target rotational speed signal; calculates a deviation between the polarity-applied output signal of said rotational speed sensor and the target rotational speed signal to provide a corresponding control output; makes a comparison between the polarity of the target rotational speed signal and that of the control output; allows said motor driver to drive the motor based on the control signal from said motor controller if there is agreement in the polarity between the target rotational speed signal and the control output; and generates a motor driver control signal to said motor driver to make the output of said motor driver to zero if there is disagreement in the polarity between said target rotational speed signal and said control output.

3. A reversible control apparatus according to claim 1, wherein said target rotational speed determiner, said motor controller, said subtracter, and said polarity applying means comprise a microcomputer.

* * * * *